United States Patent [19]

Simms

[11] Patent Number: 4,973,161

[45] Date of Patent: Nov. 27, 1990

[54] RING LASER GYROSCOPES

[75] Inventor: Graham J. Simms, Bracknell, Great Britain

[73] Assignee: British Aerospace Public Limited Company, London, England

[21] Appl. No.: 268,592

[22] Filed: Nov. 8, 1988

[30] Foreign Application Priority Data

Dec. 10, 1987 [GB] United Kingdom ................. 8728831

[51] Int. Cl.⁵ ........................ G01C 19/64; H01S 3/083
[52] U.S. Cl. ........................................ 356/350; 372/94
[58] Field of Search .................... 356/350; 372/94, 107

[56] References Cited

U.S. PATENT DOCUMENTS

| 3,433,568 | 3/1969 | Skalski et al. | 356/350 |
| 3,683,297 | 8/1972 | Hobart et al. | 372/93 |
| 4,392,229 | 7/1983 | Hostetler | 356/350 X |

FOREIGN PATENT DOCUMENTS

| 0040004 | 4/1981 | European Pat. Off. . | |
| 0117268 | 2/1983 | European Pat. Off. . | |
| 3326903 | 2/1985 | Fed. Rep. of Germany | 372/107 |
| 2593650 | 1/1987 | France . | |
| 56-91487 | 7/1981 | Japan | 372/94 |

OTHER PUBLICATIONS

Roland et al. "Periodic Faraday Bias and Lock-In Phenomena in a Laser Gyro", Applied Optics, vol. 12, No. 7, Jul. 7 1973, pp. 1460–1467.

Primary Examiner—Vincent P. McGraw
Attorney, Agent, or Firm—Nixon & Vanderhye

[57] ABSTRACT

The invention relates to a ring laser gyroscope in modular form. In a favored construction, two modules each comprising one or more mirrors in fixed relationship have a third module comprising gain bores sealed in a gas-tight manner therebetween.

20 Claims, 7 Drawing Sheets

RING LASER GYROSCOPES

BACKGROUND OF THE INVENTION

Early designs of ring laser gyroscopes comprised a discharge tube filled with a gas containing a lasant and having Brewster angle windows for the emission of polarised laser beams. The discharge tube was located between two mirrors and one or more further mirrors were positioned so that, together, the mirrors defined a polygonal path for two laser beams travelling in opposite directions in a closed loop.

Designs of ring laser gyroscopes have progressed to fabricating these from a single block of dielectric material having a low coefficient of thermal expansion e.g. Zerodur. Such ring laser gyroscopes have the advantage of being sufficiently rugged that they can be dithered to overcome the well-known problem of lock-in of the laser beams. Bores are drilled in the monoblock, as it is known, to define each limb of the lasing cavity as well as extra bores leading to electrodes to enable DC excitation of the gas in the lasing cavity, gas reservoir bores and a gas filling tube. Consequently, precise machining is necessary and the gyroscope mirrors have to form gas-tight seals which means that they need to be relatively large. Moreover, machining of the surfaces for mounting the mirrors needs to be very precise.

SUMMARY OF THE INVENTION

According to the present invention we provide a ring laser gyroscope having a structure defining at least one cavity which, in use, is filled with a gas and comprising reflective surfaces positioned in the cavity to define a polygonal path for two laser beams which, in use, travel in opposite directions around the cavity wherein the cavity-defining structure is in modular form.

A substantial advantage of the present invention is that it obviates the need for the mirrors to act as gas-tight seals thereby reducing the number of seals which is important as it is the seals which can often be a source of failure in a ring laser gyroscope. Furthermore, smaller mirrors can consequently be used which eases mirror manufacture.

Another important advantage is that the degree of precision machining required is reduced as will be explained. Furthermore, errors in manufacture which would previously have meant wastage of one complete monoblock only mean that one of the component modules needs to be wasted.

Preferably, at least one module comprises reflective surfaces defining two corners of the polygonal path. The reflective surfaces are preferably mutually orthogonal. This latter feature means that a laser beam incident on such a module leaves the module parallel to the direction of incidence and has the advantage that small misalignments in three of the six degrees of freedom will not matter as will be fully explained hereinafter.

In the embodiments to be described the structure comprises three modules:
first and second modules each comprising one or more of the reflective surfaces, and
a third module comprising a plurality of bores which, in use, operate as gain bores.

In practice, it is envisaged that the gain bores will be drilled but that the first and second modules will be configured so that no drilling of bores to define the lasing cavity will be required. The first and second modules could perhaps be moulded.

In the embodiments to be described, the first and second modules both comprise reflective surfaces defining two corners of the polygonal path.

Optionally, a ring laser gyroscope according to the present invention may comprise a plurality of said cavities wherein the first and second modules both comprise at least three reflective surfaces.

This feature could be embodied in a biaxial ring laser gyroscope in which the first and second modules both comprise two pairs of mirrors defining two orthogonal laser beam paths and in which the mirrors in each pair are mutually orthogonal.

Alternatively, a ring laser gyroscope according to the present invention may comprise three of said cavities wherein both of the first and second modules comprise three reflective surfaces arranged mutually orthogonally whereby each reflective surface defines a corner of two mutually perpendicular polygonal paths.

A triaxial ring laser gyroscope embodying this feature is described hereinafter and corresponds in concept to the triaxial ring laser gyroscope described in our UK patent No. 2076213B.

Preferably, one or more of the modules comprises a vacancy which, in use, provides a gas reservoir. Such vacancies may conveniently take the place of bores drilled in conventional monoblock ring laser gyroscopes.

The reflective surfaces may be provided by discrete mirrors bonded to one or more of the modules. Alternatively, it is conceivable that the reflective surfaces could be provided by a reflective coating applied to one or more surfaces of the interior of one or more of the modules.

A ring laser gyroscope according to the present invention may comprise electrodes to permit DC excitation of the gas in the cavity to initiate lasing wherein at least one electrode is mounted externally on a module comprising one or more of the reflective surfaces. Alternatively, at least one electrode, e.g. the cathode, may be mounted in a recess in a module comprising gain bores so as to save space and further reduce the number of seals required.

Alternatively, a ring laser gyroscope according to the present invention may comprise electrodes to permit an RF excitation signal to be capacitively coupled to the gas in the cavity to initiate lasing. The concept of a modular ring laser gyroscope is ideally suited to a radio frequency excitation technique because the vacancies in the modules conveniently provide gas reservoirs. Preferably, a gas reservoir is provided adjacent each electrode. Preferably, the or each module providing gain bores is generally solid so as to provide sufficient capacitance for RF excitation.

Each of the embodiments adapted for RF excitation to be described comprises two electrodes orientated oppositely and generally parallel to one another. These electrodes may be formed by metallising outer surfaces of one or more modules of the ring laser gyroscope.

BRIEF DESCRIPTION OF THE DRAWINGS

Particular embodiments of the present invention will now be described, by way of example, with reference to the accompanying drawings in which.

DETAILED DESCRIPTION OF PREFERRED EMBODIMENTS

Figure 1:
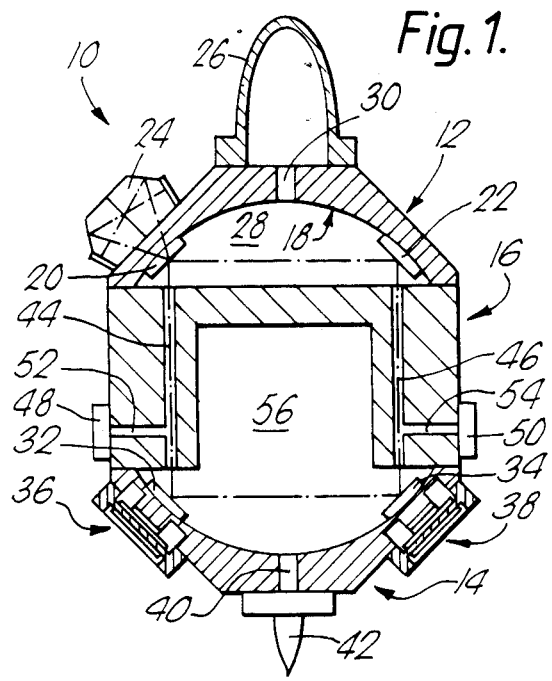
FIG. 1 is a sketch in cross section of a modular single axis ring laser gyroscope according to the present invention and which is adapted for DC excitation.

In FIG. 1 a modular ring laser gyroscope indicated generally at 10 has a cavity in which two laser beams travelling in opposite directions traverse a square path as indicated in broken lines. The ring laser gyroscope 10 comprises two mirror modules 12 and 14 and a gain bore module 16 which is sealed in a gas-tight manner inbetween the mirror modules 12 and 14. The modules 12, 14 and 16 are made from a dielectric material e.g. a glass material such as Zerodur, a ceramic, a glass ceramic or a plastics material. It is envisaged that at least the two mirror modules 12 and 14 may be moulded. The mirror modules 12 and 14 are each attached to the gain bore module 16 using a cold compression seal. Optical contacting may be used but is relatively expensive. Other alternatives are to use epoxy resin or glass fusion, depending on the material used. Alignment marks are provided on each of the modules 12, 14 and 16 to aid assembly.

The mirror module 12 is generally arcuate in cross section and comprises an arcuate internal surface 18 to which is bonded two planar mirrors 20 and 22 located mutually orthogonally. The mirrors 20 and 22 are Zerodur discs 8 mm in diameter and 2 mm thick and are each attached to the mirror module 12 using transparent non-outgassing optical cement. The mirror discs can be fabricated from other materials and may be smaller than the dimensions given here by way of example. A device facilitating attachment of mirrors to a mirror module is shown in FIG. 8 and will be described hereinafter.

A readout prism 24 of known type is attached to an external surface of the mirror module 12 adjacent the mirror 20. The mirror 20 is designed to transmit a portion of each of the counter-rotating laser beams so that these can be mixed to enable information regarding rotation of the cavity to be derived. A cathode 26 is mounted externally on the mirror module 12 and communicates with a gas reservoir 28 formed between the arcuate surface 18 and the gain bore module 16 by means of a duct 30.

The mirror module 14 is of similar construction to the mirror module 12 and comprises two mirrors 32 and 34 which are similar to the mirrors 20 and 22 but which are curved. The mirrors 32 and 34 are designed to effect cavity path length control by means of known bimorph arrangements 36 and 38 comprising piezoelectric devices. A fill bore 40 and associated gas-tight cap 42 are provided to enable gas to be supplied to the cavity and to be replenished if necessary.

The gain bore module 16 comprises two parallel gain bores 44 and 46 of equal length and comprises two anodes 48 and 50 which communicate with the gain bores 44 and 46 by means of ducts 52 and 54.

The centre of the gain bore module 16 is largely hollow and, together with the mirror module 14, defines a gas reservoir 56.

Figure 2:
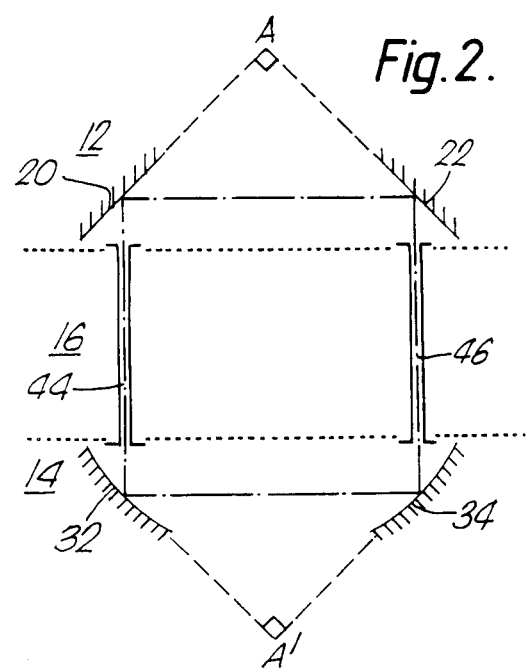
FIG. 2 is a diagram illustrating the alignment properties of the ring laser gyroscope shown in FIG. 1.

Referring to FIG. 2 the same reference numerals are used as in FIG. 1. The plain mirrors 20 and 22 on the mirror module 12 are mutually orthogonal as are the curved mirrors 32 and 34 on the mirror module 14. As is well known, with the mirror arrangement shown, a laser beam incident on one of the mirrors in either of the mirror modules 12 or 14 will leave that mirror module parallel to its direction of incidence. This means that small misalignments in three of the six degrees of freedom will not affect the alignment of the laser beam within the gain bores 44 and 46. For each mirror module, these three degrees of are translation in the Y or Z directions and rotation about an axis passing through points A, A' and extending perpendicular to the plane of the paper.

Figure 3:
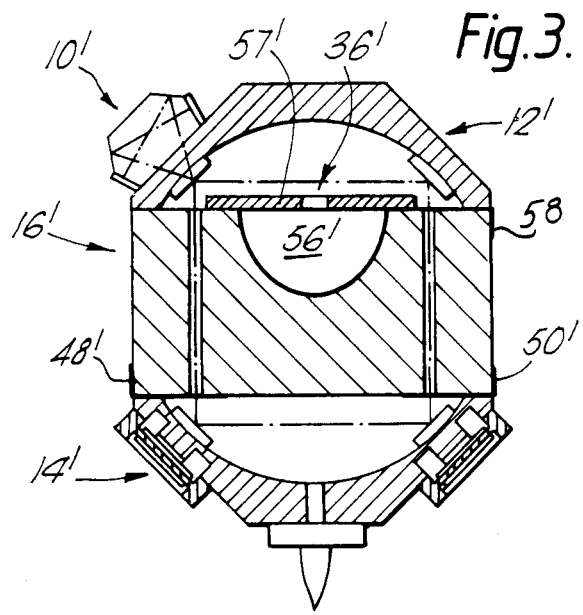
FIG. 3 is a sketch in cross section of a modified ring laser gyroscope also adapted for DC excitation.

The ring laser gyroscope shown in FIG. 3 is similar to that shown in FIG. 1 and the same reference numerals will be used with a prime.

The main difference is that the gain bore module 16 comprises an arcuate metallised recess 56' which, together with a plate 57' forms an internal cathode 36' thereby reducing the total volume of the ring laser gyroscope 10'. Importantly, this feature also reduces by one the number of gas-tight seals required. Electrical connections to the cathode 36' are made by means of electrically conductive coatings on the upper surface of the gain bore module 16' which exit where indicated at 58. Another difference is the use of metallisation on the surface of the gain bore module 16' to form anodes 48', 50', thus further reducing the requirement for gas seals.

In use, the ring laser gyroscopes 10 and 10' shown in FIGS. 1 and 3 undergo DC excitation to initiate lasing. A potential difference is generated between the cathode 26, 36' and the anodes 48, 48' and 50, 50' to cause the gas in the cavity to discharge and to initiate lasing in a well known manner. A relatively large potential difference is required to initiate lasing and a relatively low potential difference is required to maintain lasing in the cavity.

Figure 4:
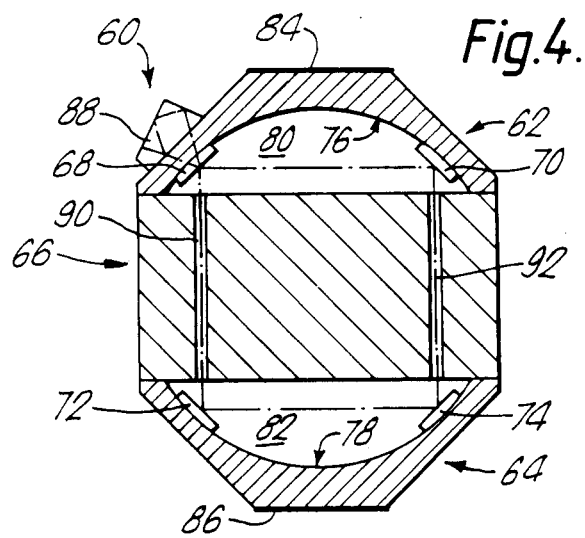
FIG. 4 is a sketch in cross section of a modular single axis ri laser gyroscope according to the present invention which is adapted for RF excitation.

Referring to FIG. 4, a ring laser gyroscope indicated generally at 60 and which is adapted for radio frequency excitation comprises two mirror modules 62 and 64 and a gain bore module 66 sealed in a gas-tight manner therebetween. The modules 62, 64 and 66 are all made of a dielectric material. The mirror modules 62 and 64 are of the same shape as the mirror modules 12 and 14 in FIG. 1 and, likewise, each of the mirror modules 62 and 64 comprises a pair of mutually orthogonal mirrors 68, 70 and 72, 74. The mirrors 68 and 70 are plane and the mirrors 72 and 74 are curved. Each of the mirror modules 62 and 64 has an arcuate internal surface 76, 78 which, together with the gain bore module 66, defines a gas reservoir 80, 82.

Each of the mirror modules 62 and 64 comprises an external face which is metallised to form two generally parallel and opposed electrodes 84 and 86. A readout prism 88 of known type is mounted externally on the mirror module 62. A fill tube (not shown) is included in the mirror module 64.

The gain bore module 66 is generally solid except for two parallel gain bores 90 and 92 of equal length.

In use, an RF signal is applied to the electrodes 84 and 86 and is capacitively coupled via the dielectric material of the mirror module 62 and 64 to plasma in the gas reservoirs 80 and 82. Thus, the electrodes 84 and 86 each act as one plate of a coupling capacitor, the other plate being formed by the plasma in the gas reservoirs 80 and 82. The gain bore module 66 needs to be a generally solid dielectric block to ensure that charge is channelled through the gain bores 90 and 92.

A fuller explanation of the RF excitation technique in ring laser gyroscopes can be obtained from our co-pending patent application entitled "Ring Laser Gyroscopes" of even date.

A biaxial ring laser gyroscope based on any one of the embodiments shown in FIGS. 1, 3 and 4 could be formed by making two mirror modules each comprising two pairs of mirrors, the mirrors in each pair being mutually orthogonal and the pairs of mirrors defining two orthogonal laser paths. The gain bore module would comprise four parallel gain bores of equal length so that, with the two mirror modules, the gain bore module would define two orthogonal square paths for counter-rotating laser beams. The two square paths would not share any of the mirrors.

In a biaxial ring laser gyroscope of this type which is adapted for DC excitation, a single cathode mounted as shown in FIG. 1 or FIG. 3 could be employed and there would be four anodes, two for each of the sensitive ames placed in positions corresponding to those shown in FIGS. 1 and 3.

Alternatively, if such a biaxial ring laser gyroscope were adapted for RF excitation, two parallel opposed electrodes positioned as shown in FIG. 4 could be used.

Figure 5:
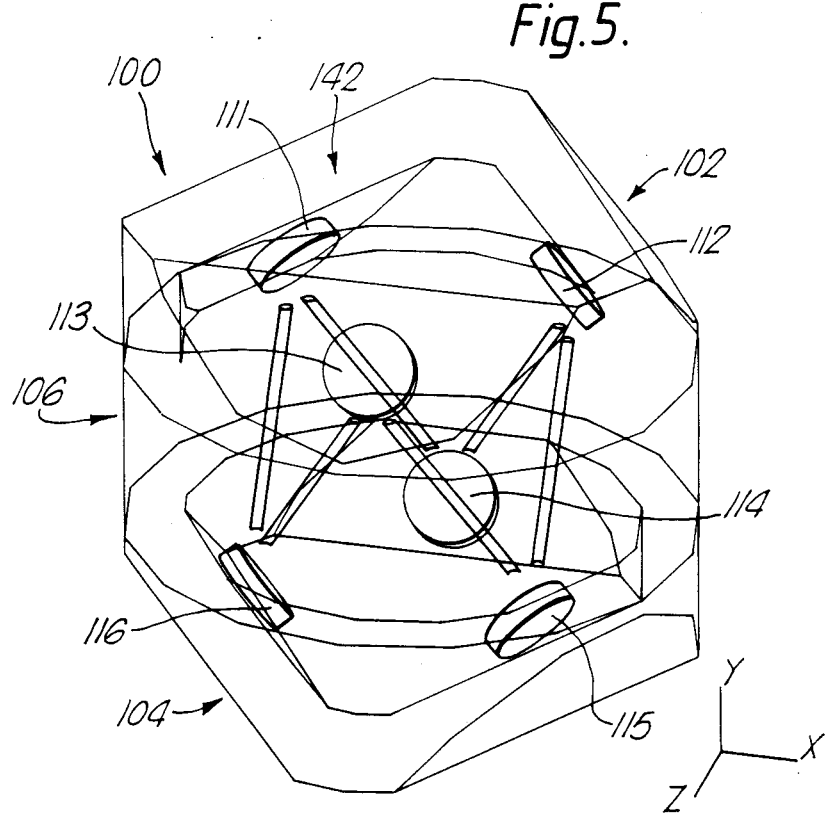
FIG. 5 is a perspective view of a triaxial ring laser gyroscope according to the present invention.
Figure 6:
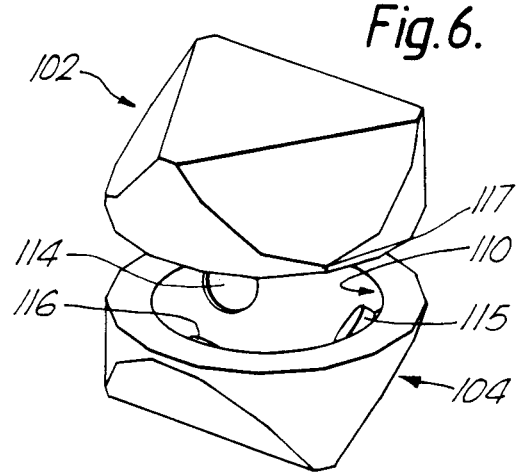
FIG. 6 is a perspective view of the two mirror modules of the gyroscope of FIG. 5.
Figure 7:
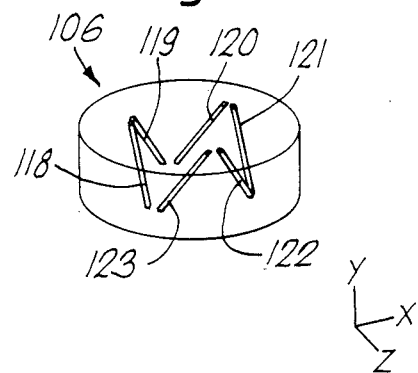
FIG. 7 is a perspective view of the gain bore module of the gyroscope of FIG. 5.

FIGS. 5 to 7 relate to a triaxial ring laser gyroscope indicated generally at 100 comprising two mirror modules 102 and 104 and gain bore module 106 sealed in gas-tight manner therebetween. The triaxial ring laser gyroscope 100 is generally cylindrical in shape and all of the modules 102. 104 and 106 are made from a dielectric material e.g. a glass such as Zerodur, a ceramic, a glass-ceramic or plastics.

Each of the mirror modules 102 and 104 is formed with an internal generally hemispherical surface 108, 110 on which is mounted three mirrors 111, 112, 113 and 114, 115 and 116 respectively. Each set of three mirrors is arranged mutually orthogonally i.e. as if each of the three mirrors were attached to one of three adjacent faces of a cube. Thereby, according to the properties of an optical cube, a laser beam entering either of the mirror modules 102 or 104 exits parallel to the direction of incidence and small misalignments in three of the six degrees of freedom relative to each individual laser path can be tolerated.

A gas filled tube (not shown) would be provided at a suitable place on one of the mirror modules 102 or 104. An alignment mark 117 is provided on each of the mirror modules for a purpose to be described.

FIG. 7 shows the gain bore module 106 which is generally cylindrical and which comprises six gain bores 118–123 of equal length drilled therein. The pairs 118, 121 and 119, 122 and 120, 123 of the gain bores are parallel.

The gain bore module 106 is sealed in a gas-tight manner between the mirror modules 102 and 104 using a suitable process. When assembled, the mirrors 111–116 together with the gain bores 118–123 define three square mutually orthogonal paths for counter-rotating laser beams so that the ring laser gyroscope 100 is sensitive in all three axes.

Typically, a triaxial ring laser gyroscope of the type shown in FIG. 5 in which each of the orthogonal paths has a length of 10 cms would have overall dimensions of approximately 5 cms diameter×5 cms height.

The modular triaxial ring laser gyroscope 100 of FIGS. 5–7 can be adapted for DC excitation or for RF excitation.

Referring to FIG. 8, the triaxial ring laser gyroscope 100 is shown adapted for DC excitation. It comprises a single, externally mounted cathode 139 and an anode associated with each of the gain bores 118–123. Four of these anodes, 140–143, are visible and each one has an associated duct 144–147 respectively communicating with an adjacent gain bore.

Readout prisms 148 and 149 are shown on the mirror module 102. A further readout prism (not shown) is also attached to the mirror module 102.

Figure 8A:
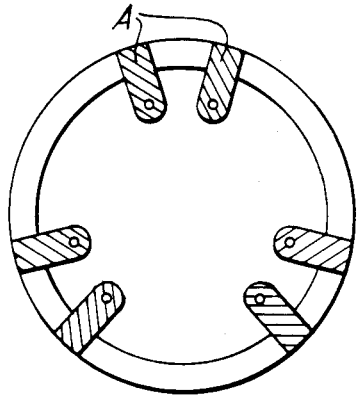
FIG. 8A is a diagrammatic cross section of the underside of a modified gain bore module.

Metallisation of the surfaces on the gain bore module can be used to provide the anodes as indicated in FIG. 8A, so as further to reduce sealing requirements.

Six anodes A are shown and each one is generally L-shaped in side view like the anodes 48' and 50' in FIG. 3. The area of the seal between the gain bore module and an adjacent mirror module is cross-hatched.

Figure 8B:
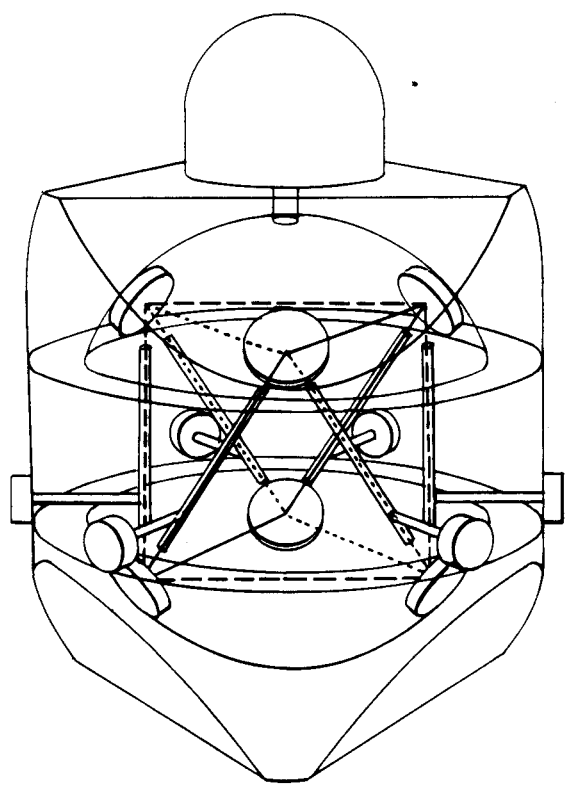
FIG. 8B is similar to FIG. 8 but not exploded and with no reference numerals, showing the orthogonal laser paths.
Figure 8:
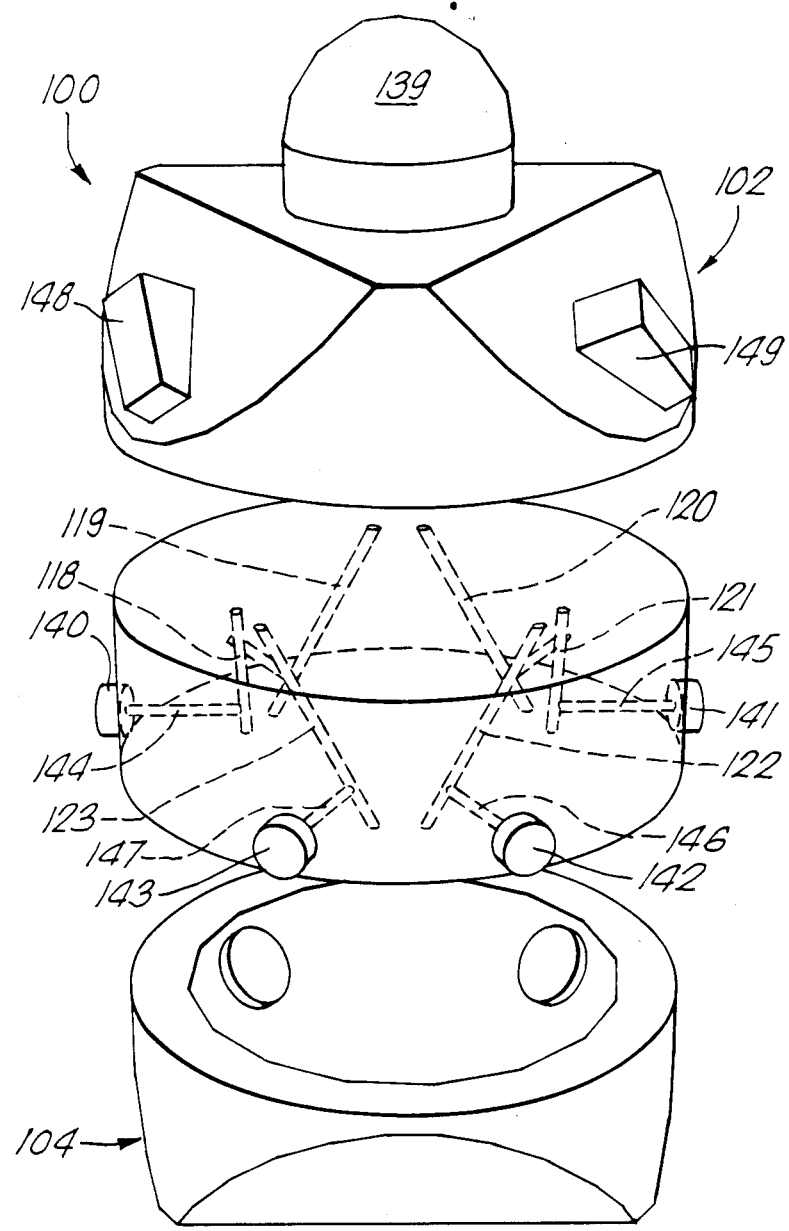
FIG. 8 is an exploded view of the triaxial ring laser gyroscope of FIG. 5 adapted for DC excitation.

The three orthogonal paths are indicated in FIG. 8B, in full, broken and dotted lines respectively.

In the case of RF excitation, the top flat surface 142 indicated in FIG. 5 and the corresponding surface on the underside of the triaxial ring laser gyroscope 100 would be metallised to provide two opposed electrodes. In use, the electrodes each form one plate of two coupling capacitors and plasma in the gas reservoirs formed between the mirror modules 102, 104 and the gain bore module 106 form the other plates of the coupling capacitors.

It will be understood that, in practice, a readout prism will be provided for each of the sensitive ames of the ring laser gyroscope 100. If cavity path length control is required, bimorphs of known type can be machined into the mirror modules 102 and 104.

The following table indicates the numbers of seals in conventional monoblock ring laser gyroscopes in comparison with those in modular gyroscopes according to the present invention;

| CONVENTIONAL (MONOBLOCK) RING LASER GYROSCOPES | | MODULAR RING LASER GYROSCOPES | | | |
| --- | --- | --- | --- | --- | --- |
| | | SINGLE AXIS RLG HAVING 4 MIRRORS EXCITATION | | TRIAXIAL RLG HAVING 6 MIRRORS EXCITATION | |
| SINGLE AXIS RLG HAVING 4 MIRRORS | TRIAXIAL RLG HAVING 6 MIRRORS | DC | RF | DC | RF |
| 8 | 14 | 5 (3 if the electrodes are internally mounted) | 3 | 9 (3 if the electrodes are internally mounted) | 3 |

In the above table it is assumed that in DC excited ring laser gyroscopes with externally mounted electrodes, the fill tube is combined with the cathode to save a seal. In practice, there will normally be an extra seal at the pinched end of the fill tube but this a seal has not been included in the Figures shown.

The present invention enables the number of gas-tight seals to be reduced because it removes the need for the mirrors to act as seals. In consequence, smaller mirrors can be used which enables more mirrors to be coated in a single coating operation thus easing mirror manufacture. It can be seen that very substantial reductions in the number of seals required is obtained in the RF excited modular designs.

A modular ring laser gyroscope according to the present invention is particularly suited for low cost manufacture for use in applications where the accuracy requirements are not stringent. The concept of a modular ring laser gyroscope is particularly suited for application to RF excited ring laser gyroscopes because the provision of gas reservoirs adjacent the electrodes can easily be made an inherent feature of the design whereas the provision of a suitable gas volume above and below the gain bores in a conventional monoblock ring laser gyroscope may be difficult to achieve. The concept of a modular ring laser gyroscope can also be applied to a single axis ring laser gyroscope having three mirrors defining a triangular lasing path as indicated in FIG. 9.

Figure 9:
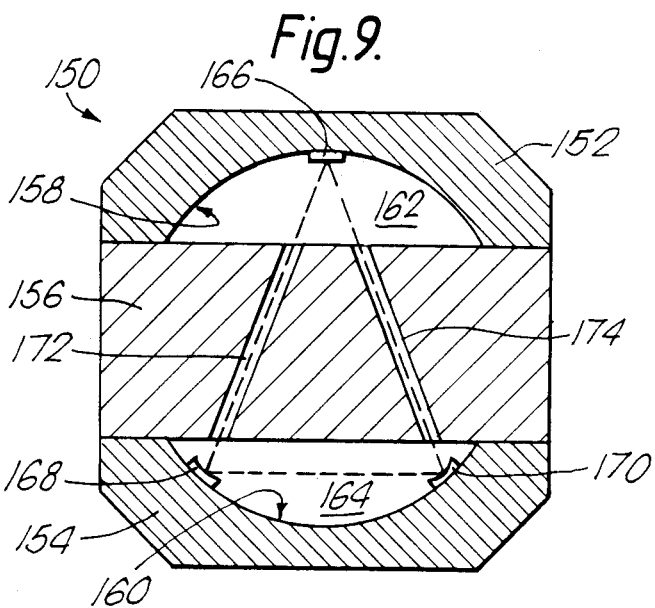
FIGS. 9 to 13 are diagrams illustrating further possible configurations of a modular ring laser gyroscope according to the present invention.

In FIG. 9 a single axis ring laser gyroscope is indicated generally at 150 and comprises two mirror modules 152 and 154 and a gain module 156 sealed in a gas-tight manner therebetween.

The mirror modules 152 and 154 comprise arcuate internal surfaces 158, 160 which, together with the gain bore module 156, define gas reservoirs 162 and 164. The mirror module 152 comprises one plane mirror 166 and the mirror module 154 comprises two curved mirrors 168 and 170.

The gain bore module 156 comprises two gain bores 172 and 174 which, together with mirrors 166, 168 and 170, define a triangular lasing path shown in dotted lines.

Figure 10:
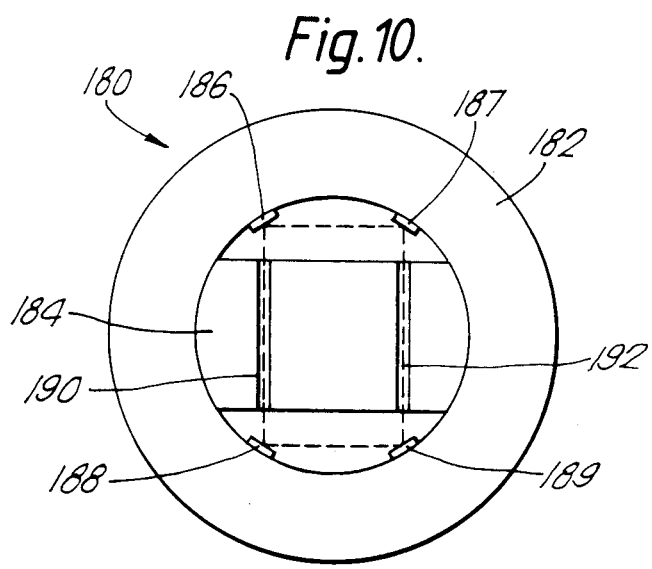

An alternative modular design is shown in FIG. 10 in which a single axis ring laser gyroscope is indicated generally at 180. The ring laser gyroscope 180 comprises a cylindrical mirror module 182 and a gain bore module 184 sealed in a gas-tight manner therewithin. The mirror module 182 comprises four mirrors 186-189. The mirrors 186, 187 are plane mirrors and the mirrors 188, 189 are curved mirrors. The gain bore module comprises two parallel gain bores 190 and 192 of equal length which, together with the mirrors 186-189 comprise a rectangular laser beam path shown in dotted lines. Flat cover plates (not shown) are sealed to the top and bottom of the mirror module 182.

Figure 11:
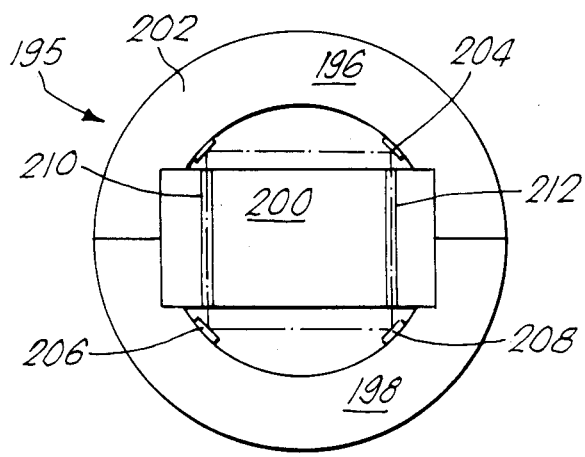

A further alternative design is illustrated in FIG. 11 in which a ring laser gyroscope is indicated at 195. The ring laser gyroscope 195 comprises two hemispherical mirror modules 196 and 198 and an annular gain bore module 200. Each of the mirror modules 196 and 198 comprises two mutually orthogonal mirrors 202, 204 and 206, 208 respectively defining a rectangular lasing path shown in broken lines. The gain bore module 200 comprises two parallel gain bores 210 and 212 of equal length.

It will be understood that the arrangement shown in FIG. 11 could be adapted to form a triaxial ring laser gyroscope by providing three mutually orthogonal mirrors in each of the mirror modules 196 and 198 and by providing six suitable gain bores in the gain bore module 200.

Figure 12:
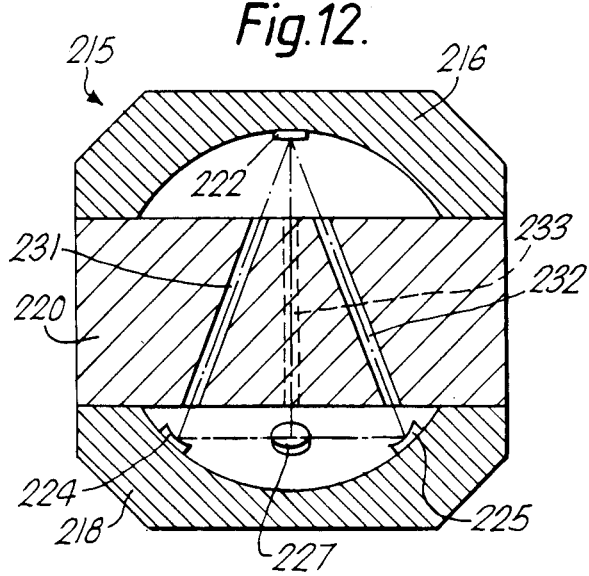
Figure 13:
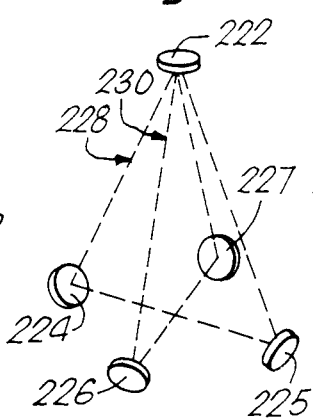

Referring to FIG. 12, there is shown an arrangement somewhat similar to that of FIG. 9 but adapted to form a biaxial ring laser gyroscope 215. The ring laser gyroscope 215 comprises two mirror modules 216 and 218 and a gain bore module 220. The mirror module 216 comprises one mirror 222. The mirror module 218 comprises four mirrors 224 to 227 arranged as two pairs of mutually orthogonal mirrors 224, 225 and 226, 227 respectively defining two mutually orthogonal laser paths. FIG. 13 illustrates more clearly the arrangement of the mirrors 222 and 224 to 227 of the ring laser gyroscope 215 to define two perpendicular triangular paths indicated in dotted lines. As is evident from FIG. 13, the mirror 222 is shared by both of the laser paths.

The gain bore module 220 comprises four gain bores of which three, 231 to 233, are indicated in FIG. 12. The gain bores 231 and 232 lie in the same plane and are associated with laser path 228. The remaining two gain bores together lie in a plane perpendicular to that of the gain bores 231 and 232 and are associated with the laser path 230.

It is to be understood that both FIGS. 9 to 13 are diagrammatic and are intended simply to illustrate possible arrangements of modules. Other components e.g. start-up electrodes, cavity path length control devices, gas-infill tubes, readout prisms etc. would be included in practice.

I claim:
1. A ring laser gyroscope comprising:
   a first module having first and second faces and an electromagnetic radiation admitting path from said first face to said second face;

a second module having a portion defining a recess in which an electromagnetic radiation reflecting means is positioned for receiving radiation from said path when the second module is connected to the first face of said first module;

a third module having a portion defining a recess in which an electromagnetic radiation reflecting means is positioned for receiving radiation from said path when the third module is connected to the second face of the first module wherein said three modules define at least one cavity, and said path is a polygonal path for two laser beams; and gas and electrode means for defining a laser light generator along said path.

2. A ring laser gyroscope according to claim 1, wherein the electromagnetic radiation reflection means of said second module defines two corners of said polygonal radiation path.

3. A ring laser gyroscope according to claim 1, wherein the electromagnetic radiation reflection means of said third module defines two corners of said polygonal radiation path.

4. A ring laser gyroscope according to claim 1, wherein the two electromagnetic radiation reflecting means define said polygonal path for two radiation beams whose directions of motion are opposed.

5. A ring laser gyroscope according to claim 1, wherein the electromagnetic radiation reflecting means comprises two mutually orthogonal reflective surfaces.

6. A ring laser gyroscope according to claim 1, wherein the connections between said modules form a gas-tight seal.

7. A ring laser gyroscope according to claim 6, wherein the connections between said modules are made by way of a cold compression seal.

8. A ring laser gyroscope according to claim 1, comprising a cathode connected to the recess of said second module by means of a duct.

9. A ring laser gyroscope according to claim 1, comprising a cathode connected to the recess of said third module by means of a duct.

10. A ring laser gyroscope according to claim 1, wherein the first module comprises an internal cathode.

11. A ring laser gyroscope according to claim 1, wherein an anode is connected to said radiation admitting path.

12. A ring laser gyroscope according to claim 11, wherein said gas and electrode means comprises electrodes to permit DC excitation of a gas in the recesses and the path to initiate lasing.

13. A ring laser gyroscope according to claim 1, wherein said gas and electrode means comprises electrodes to permit RF excitation of a gas in the recesses and the path to initiate lasing.

14. A ring laser gyroscope according to claim 1, wherein said gas and electrode means comprises a means for allowing gas to be supplied to the path of said first module and the recesses of said second and third modules.

15. A ring laser gyroscope according to claim 1, wherein said radiation admitting path comprises two gain bores.

16. A ring laser gyroscope according to claim 1, wherein said radiation admitting path comprises three gain bores.

17. A ring laser gyroscope according to claim 1, wherein said radiation admitting path comprises four gain bores and said second module comprises a further electromagnetic radiation reflecting means such that two orthogonal triangular radiation paths are defined.

18. A ring laser gyroscope according to claim 1, wherein said radiation admitting path comprises four parallel gain bores, and the said second and third modules each comprise two electromagnetic radiation reflective means positioned orthogonally to one another, such that two mutually orthogonal square paths for radiation are defined.

19. A ring laser gyroscope according to claim 1, wherein said radiation admitting path comprises six gain bores, and the second and third modules each comprise three electromagnetic radiation reflective means, such that three mutually orthogonal square paths for radiation are defined.

20. A ring laser gyroscope comprising:

a first module having first and second faces and an electromagnetic radiation admitting path from said first face to said second face; and a second module into which said first module is inserted such that two cavities are defined by one internal surface of the second module and said first face of the first module and another internal surface of the second module and said second face of the first module, respectively, each of said cavities containing an electromagnetic radiation reflecting means positioned on each of the one and another internal surfaces for receiving radiation from said path.

* * * * *